Oct. 1, 1963  M. FAVRE  3,105,285
WAVE GUIDING STRUCTURE AND METHOD OF MAKING THE SAME
Filed May 10, 1960
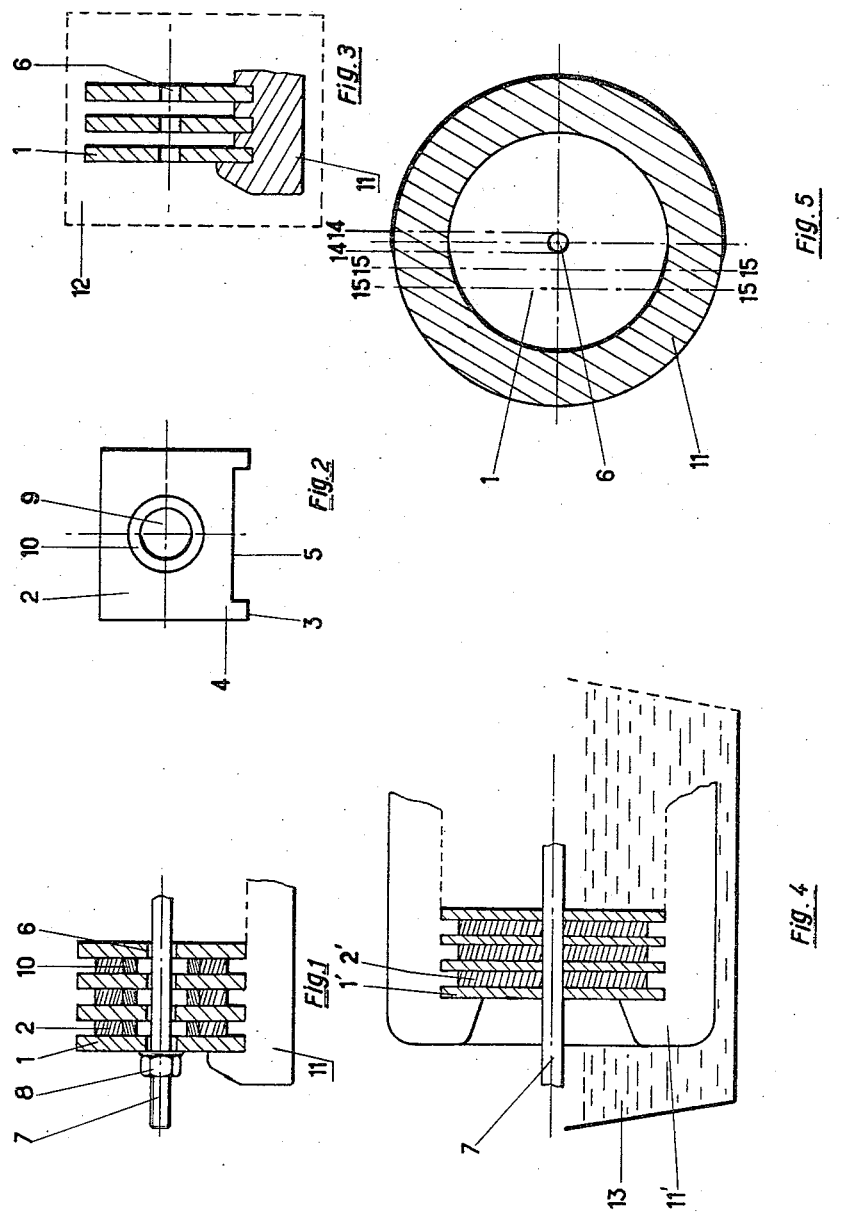
INVENTOR
Maurice FAVRE
BY Craig and Freudenberg
ATTORNEYS

United States Patent Office 3,105,285
Patented Oct. 1, 1963

3,105,285
WAVE GUIDING STRUCTURE AND METHOD OF MAKING THE SAME
Maurice Favre, Paris, France, assignor to Compagnie Generale De Telegraphie Sans Fil, Paris, France
Filed May 10, 1960, Ser. No. 28,099
Claims priority, application France May 27, 1959
6 Claims. (Cl. 29—155.5)

The present invention relates to a wave guiding structure or delay line for use in ultra-high frequency electron discharge devices, and more particularly to a wave guiding structure and method for making the same for use with electron discharge devices of the traveling wave tube type operating within the millimeter band.

The practical realization of delay lines or wave guiding structures having a geometrically periodic structure encounters great difficulties when it is concerned with wave guiding structures or delay lines intended to operate in the millimetric wave band in which case certain dimensions thereof become extremely small. The classic methods of milling the periodic elements such as the fingers of an interdigital delay line or the vanes or a vane-type delay line do not permit a practical realization with the desired precision and required tolerances when the dimensions of the elements and of the spaces therebetween are of the order of a millimeter or less, and, at any rate, would require in all cases great dexterity on the part of the operator and minute accuracy in the manufacture thereof.

Furthermore, the minimum dimension that may be realized by a milling or machining operation depends on the milling cutters or machine tools that are available in the particular technical field which automatically places a limit of the order of 0.2 millimeter to the distance between two fingers or vanes of a wave guiding structure or delay line since this is the minimum distance obtainable with present-day available tools.

The method steps of stacking followed by brazing, as known in the prior art, require a thermal treatment which causes loss on the part of the copper of its properties of mechanical rigidity and entrains deformations therein. Additionally, the brazing operation adds an intermediary metal of which the depositions form beads, burrs or seams which disturb the regularity of the structure and entrain variations in the pitch of a wave guiding structure.

The present invention aims at a method which avoids the inconveniences of the prior art methods.

The method according to the present invention essentially consists of the steps of assembling the periodic elements of the wave guiding structure in the finished relative positions thereof by clamping the same alternately with spacer members made of a material different from that of which the wave guiding structure or delay line is made and which eventually is capable of being dissolved in a solvent which does not attack the material of the periodic elements, of rigorously aligning the spacers on the side thereof on which the periodic elements must be secured to a common base, of thereupon realizing this common base by galvanoplasty, and of eliminating the spacers by either a mechanical or chemical process, for example, by dissolving the same by means of a suitable solvent. The final assembled delay line or wave guiding structure is thereby realized without any thermal treatment and without machining of the periodic elements, the only machining to which the assembly of the wave guiding structure has to be subjected being the truing of the lateral surfaces and the fitting of the length of the periodic elements. For that purpose, the delay line structure may be dipped into "Plexiglas" according to known techniques.

Accordingly, it is an object of the present invention to provide a method of manufacture for wave guiding structures adapted to be used with millimetric waves which obviates the inadequacies and shortcomings of the prior art method.

Another object of the present invention resides in the provision of a method permitting great accuracy in the spacing between periodically geometric elements of a delay line structure for use with an electron discharge device operating in the millimeter wave band which permits great accuracy without entailing expensive operations in either manufacture or assembly.

Still another object of the present invention is a process for manufacturing hyper-frequency delay line structures adapted to be used in the millimetric wave band which obviates the necessity for milling or similar machining operations as well as any assembling steps involving the application of heat.

A further object of the present invention resides in the provision of a wave guiding structure for use in the millimetric wave band in which the periodic geometric elements are rigorously uniform and in which the spacing is maintained within close tolerances notwithstanding the minute spacing required between adjacent geometrically periodic elements.

A still further object of the present invention resides in the provision of a wave guiding structure which may be manufactured readily, without involving a great deal of mechanical skill on the part of the operator and which also saves cost in connection with the manufacture thereof.

These and other objects, features and advantages of the present invention will become more obvious from the following description when taken in connection with the accompanying drawing which shows, for purposes of illustration only, several embodiments in accordance with the present invention, and wherein FIGURE 1 is a longitudinal axial cross-sectional view through a portion of a delay line representing one stage in the manufacture thereof, the delay line being a vane type delay line, FIGURE 2 is an end elevational view of an element used in connection with the manufacture of the delay line structure of FIGURE 1, FIGURE 3 is a longitudinal axial cross-sectional view through the delay line of FIGURE 1, illustrating a subsequent stage in the manufacture thereof, FIGURE 4 is an axial cross-sectional view through a structure manufactured in accordance with the present invention, and FIGURE 5 is a transverse cross-sectional view through the wave guide of FIGURE 4, indicating the possibility of cutting off slices to provide a comb or ladder type delay line.

Referring now more particularly to the drawing wherein like reference numerals are used throughout the various views to designate corresponding parts, in order to realize by means of the method in accordance with the present invention as final product a vane-type delay line or a comb-type interdigital delay line illustrated in FIGURE 1, the first step according to the present invention consists of stacking alternately thin plates 1 of copper and spacers 2 of suitable material, such as iron, steel, Duralumin, or the like. The spacers 2 which are represented in elevational view in FIGURE 2, are aligned, for example, along the edge 3 of heel portions 4, the distance between the edge 3 and the edge 5 of each spacer 2 being uniform with great precision and accuracy from one spacer to the other. The plates 1 may surpass slightly the edge 5 but the edges thereof may also be aligned with the same. The assembly thus stacked together is thereupon subjected to longitudinal compression, for example, by means of a vice, bolt and nuts, press or any analogous device. In the case in which the delay line in question is a line having vanes or fingers apertured by means of a longitudinal channel 6 for the passage therethrough of the electron beam, such channel 6 may be utilized to pass therethrough a rod 7 which will assure the tightening by means of nuts 8. In that case, the spacers 2 include corresponding apertures 9. Preferably but not necessarily, copper washers 10 may be placed into these orifices 9 which serve as spacers to maintain provisionally the parallelism of the vanes 1 after dissolution of the spacers 2 until removal of the rod 7 is achieved.

After suitable control of the regularity of the spacing of the fingers, the next step involves the deposition by electrolytic means of a copper base 11 along the side of the delay line along which the spacers 2 had been aligned. Thereupon, the spacers 2 are dissolved in a suitable acid solution which does not attack the copper. Any suitable acid bath which fulfills this requirement may be used for that purpose as known in the prior art. The rod 7 is thereupon withdrawn, and the shape of the assembled structure is maintained during this withdrawal by the washers 10 which also drop out once the rod 7 is withdrawn.

As a final step, the line which assumes the condition illustrated in FIGURE 3 thereof, is submerged into liquid "Plexiglas" which is polymerized in any known manner so as to form a solid block 12 of Plexiglas. However, any other known means may also be used for rendering the elements immovable such as, for example, compressed "Plexiglas" powder, etc. The machining of the delay line in accordance with the present invention is limited, therefore, to truing the lateral surfaces and shortening of the fingers 1 to the desired length. The block may also be sawed off to provide the desired quantity of vane-type or finger-type combs of which pairs thereof form interdigital delay lines. The fingers of these lines do not necessarily include a longitudinal channel since the cutting operation thereof may be effected along longitudinal planes outside the diameter of the aperture 6. The "Plexiglas" is then dissolved, for example, within trichloroethylene. The eventual burrs are removed by a slight action of acid.

As one illustrative example, the following are the dimensions of a delay line that has been obtained by the method in accordance with the present invention and of which the combs have the following dimensions:

| | Millimeters |
|---|---|
| Length of the fingers 1 | 1.8 |
| Thickness of the fingers 1 | 0.1 |
| Spacing between fingers 1 | 0.3 |

The regularity of the structure has been realized with an accuracy of approximately 10 microns.

In another embodiment of the present invention, the elements 1 and the spacers 2 of FIGURE 1 are given the shape of circular washers. The alignment of the spacers 2′ of FIGURE 4 is then obtained by simple centering about rod 7. The provision and disposition of spacers of copper analogous to the washers 10 of FIGURE 1 is thereby obviated and becomes unnecessary since the washers 1′ of FIGURE 4 are in effect supported and maintained in the assembled position thereof by the base 11′ along the entire circumference thereof and present an inherent rigidity which is greater than the lamellae 1 having a free end as shown in FIGURE 1. The cylindrical base 11′ of FIGURE 4 is formed by turning the structure slowly about the axis 7 whereby the peripheral region of the washers 1′ bathe in the galvanoplastic tank 13. For the rest, the treatment is the same as in FIGURE 1, and a block is thereby obtained as illustrated in cross-section in FIGURE 5.

It is then possible to obtain from the block illustrated in FIGURE 5 combs by cutting the same into slices along line 14—14, or ladders by cutting the same along line 15—15.

Obviously, the present invention is not limited to the manufacture of vane-type interdigital delay lines of rectilinear structure. Quite to the contrary, the present invention and the same principles thereof may also be applied to the delay lines for circular types of tubes for use, for example, in M-type tubes of cylindrical structure about an axis parallel to the magnetic field as is well known with such M-type tubes.

The delay lines and wave guiding structure realized according to the present invention may be readily recognized under metallographic examination after acid preparation thereof, particularly by the anchoring of the periodic elements in the common base without any trace of brazing or intermediary materials other than those which are usually employed to permit or facilitate the galvanoplastic depositions. Consequently, the present invention encompasses all of the delay line or wave guiding structures presenting such characteristic.

While I have shown and described several embodiments in accordance with the present invention, it is obvious that the present invention is not limited thereto but is susceptible of many changes and modifications within the spirit and scope thereof, and I, therefore, do not wish to be limited to the details shown and described herein but intend to cover all such changes and modifications as are encompassed by the scope of the appended claims.

I claim:

1. A method of manufacturing a delay line structure, especially for use in the millimetric frequency band and having a plurality of accurately spaced geometrically periodical elements to form the periodically spaced elements of the delay line structure, comprising the steps of alternately assembling on a rod member said geometrically periodical elements with spacer elements of predetermined dimension so that said geometrically periodical elements assume the final desired accurately spaced position thereof within the delay line structure, building up by electroplating operation a common base around said geometrically periodical elements of such dimensions as to rigidly retain said geometrically periodical elements in the accurately spaced final position thereof, chemically dissolving the spacer elements in a medium which does not attack the material of which the elements of the delay line structure are constituted, removing said rod member, encasing said periodical elements in a medium imparting rigidity to the periodical portion of the delay line structure, cutting through said common base to remove portions of said periodical elements to form a delay line, and removing said medium.

2. A method as claimed in claim 1 wherein said cutting step includes cutting off slices from said structure to form a ladder-type delay line.

3. A method as claimed in claim 1, wherein said cutting step includes cutting off slices from said structure to form a comb-type delay line.

4. A method as claimed in claim 1 wherein said geometrically periodical elements are circular, and an essentially cylindrical form is imparted to said base by turning in an electroplating bath the peripheral region of the assembly.

5. A method of manufacturing a delay line structure, especially for use in the millimetric frequency band and having a plurality of accurately spaced geometrically periodical elements to form the periodically spaced elements of the delay line structure, comprising the steps of alternately assembling on a rod member said geometrically periodical elements with spacer elements of predetermined dimension so that said geometrically periodical elements assume the final desired accurately spaced position thereof within the delay line structure, building up by electroplating operation a common base at least along one side of said geometrically periodical elements of such dimensions as to rigidly retain said geometrically periodical elements in the accurately spaced final position thereof, chemically dissolving the spacer elements in a medium which does not attack the material of which the elements of the wave guide structure are constituted, removing said rod member, encasing said periodical elements in a medium imparting rigidity to the periodical portion of the delay line structure, machining said delay line structure for truing the lateral surfaces and fitting the length of the periodic elements, and removing said last-mentioned medium.

6. A method of manufacturing a delay line structure, especially for use in the millimetric frequency band and having a plurality of accurately spaced geometrically periodical elements to form the periodically spaced elements of the delay line structure, comprising the steps of alternately assembling on a rod said geometrically periodical elements with spacer elements of predetermined dimension and washers within and at least partially enclosed by said spacer elements so that said geometrically periodical elements assume the final desired accurately spaced position thereof within the delay line structure, building up by electroplating operation the common base at least along one side of said geometrically periodical elements of such dimensions as to rigidly retain said geometrically periodical elements in the accurately spaced final position thereof, chemically dissolving the spacer elements in a medium which does not attack the material of which the elements of the delay line structure and the washers are constituted thereby leaving said washers resisting said compressive force, removing said rod member and subsequently removing said washers, encasing said periodical elements in a medium imparting rigidity to the periodical portions of the delay line structure, truing the lateral surfaces of the delay line structure and fitting the length of the accurately spaced periodic elements, and thereafter removing said last-mentioned medium.

References Cited in the file of this patent
UNITED STATES PATENTS

| | | |
|---|---|---|
| 2,761,828 | Eldredge et al. | Sept. 4, 1956 |
| 2,827,589 | Hines | Mar. 18, 1958 |
| 2,881,348 | Palluel | Apr. 7, 1959 |
| 2,936,519 | Blackman | May 17, 1960 |